United States Patent [19]
Guerin

[11] 3,813,014
[45] May 28, 1974

[54] INJECTION MOULDING MACHINE

[75] Inventor: Daniel L. G. Guerin, Sartrouville, France

[73] Assignees: Vincent Rene Leflaive, Paris, France; Guy Peltier, Seine; Marcel Manceau, Paris, all of, France

[22] Filed: Feb. 27, 1973

[21] Appl. No.: 336,204

[30] Foreign Application Priority Data
Mar. 1, 1972  France .............................. 72.06982

[52] U.S. Cl. ................ 222/413, 425/245, 425/243, 425/247
[51] Int. Cl. ............................................ G01f 11/22
[58] Field of Search .......... 425/245, 243, 244, 251, 425/247, DIG. 224, DIG. 226; 222/413

[56] References Cited
UNITED STATES PATENTS
2,265,995  12/1941  Beyerlein .......................... 425/245
3,395,424  8/1968  Nouel ................................ 425/245

*Primary Examiner*—Milton S. Mehr
*Attorney, Agent, or Firm*—Woodhams, Blanchard and Flynn

[57] ABSTRACT

An injection moulding machine of the type incorporating a rotatable and reciprocable screw has on the forward end of the barrel a nozzle portion providing within it a valve cylinder larger than the bore of the barrel. A differential valve plunger having an axial passage extending through it has larger and smaller diameter portions slidably and sealingly engaged in the valve cylinder and the bore of the barrel respectively. The smaller diameter end of the valve plunger can be abutted by the nose of the screw to form a seal preventing flow through the axial passage in the valve plunger and to enable the valve plunger to be driven along the valve cylinder to eject the softened material forwardly from the valve cylinder. A plug is provided which can be operated to open or close off the injection aperture in the valve cylinder. During rotation of the screw softened material passes forwardly through the passage in the valve plunger and by reason of the differential area urges the plunger rearwards towards the screw.

4 Claims, 2 Drawing Figures

INJECTION MOULDING MACHINE

This invention relates to injection moulding machines.

According to this invention there is provided an injection moulding machine comprising a barrel having an axial bore, a screw mounted in said bore, which screw is rotatable within the bore and is movable axially along the bore, said barrel having at its forward end a nozzle portion providing within it a valve cylinder which opens to and which is of larger diameter than the bore of the barrel, a valve plunger having smaller and larger diameter portions which are slidingly and sealingly engaged in the bore of the barrel and the valve cylinder respectively, the valve cylinder being vented at its end adjacent the bore in the barrel said valve plunger having an axial passage extending therethrough, and said valve plunger being movable forwardly along the valve bore by the screw during forward injection movement of the latter, said axial passage being sealed by the screw during such forward movement, and the nozzle portion having a nozzle aperture at the forward end thereof, and a plug mounted in the aperture which plug is selectively operable to permit and to prevent the ejection of material from the valve cylinder through the nozzle aperture.

One embodiment of the invention will now be described by way of example with reference to the accompanying drawings in which.

Figure 1:
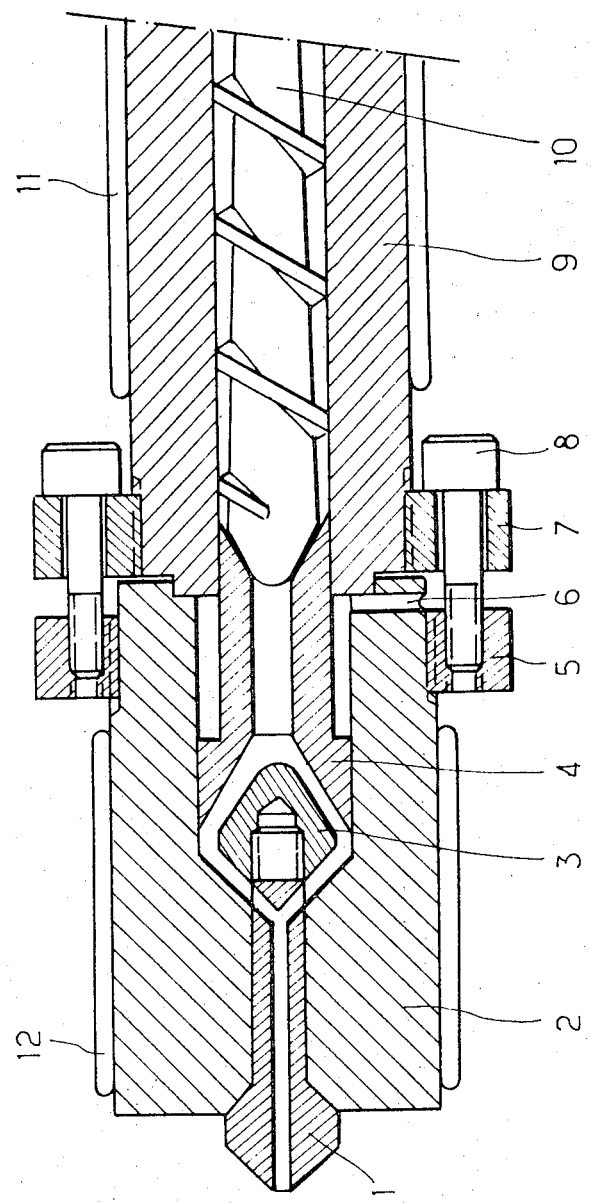
FIG. 1 shows the forward end portion of an injection moulding machine according to the invention, the valve plunger and injection screw being shown in their forward positions.
Figure 2:
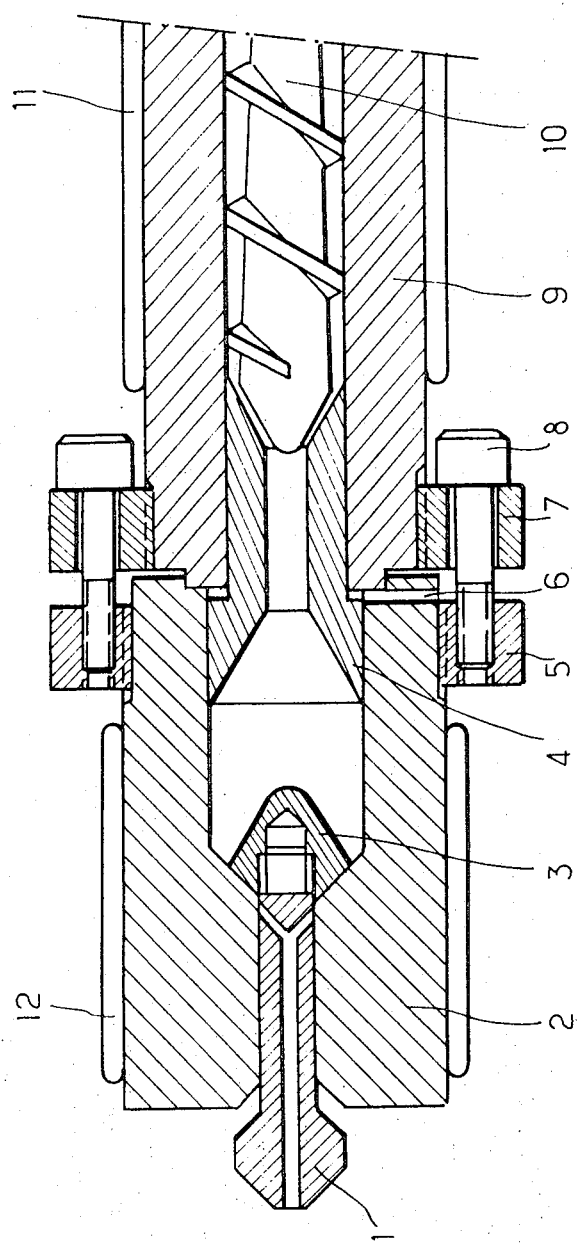
FIG. 2 is a view corresponding to FIG. 1 but with the valve plunger being shown in its rearmost position, i.e. with the valve cylinder containing its maximum charge.

Referring to the drawings, the injection moulding machine is of the kind having a barrel 9 in the bore of which a screw 10 is mounted for axial and rotational movement in the well-known manner by motors which are not shown. A nozzle portion 2 is secured to the forward end of the barrel 9 by bolts 8 engaged in flanges 5, 7 on the nozzle portion 2 and barrel 9 respectively. A valve cylinder is formed in the nozzle portion 2 and has a larger diameter than the bore of barrel 9 which opens to the valve cylinder. A differential valve plunger 4 has a larger diameter portion mounted for axial sliding movement in the valve cylinder and has a smaller diameter portion slidingly and sealingly engaged in the bore of the barrel. The cylinder space behind the larger diameter portion of the valve plunger is vented to atmosphere by a vent passage 6 in the nozzle portion. A central passage extends axially through the valve plunger and its rearward end is chamfered as shown to match the conicity of the nose of the screw 10.

A plug 1 is slidably mounted in a nozzle bore at the forward end of the nozzle portion 2, and has a head on each end, the head 3 on the rearward end being screwed on to the elongate body of the plug. A central passage through the plug extends from the forward end thereof and terminates in transverse bores which open to the valve cylinder when the plug is in its rearmost position and which are blanked off by being disposed within the nozzle bore when the plug is in its most forward position.

The heads of the plug are of double-conical form and a recess is formed in the forward end of the valve plunger and has inclined side walls matching the conicity of the adjacent end of the head 3 of the plug so as to form therewith an annular passage the cross-section of which increases in the forward direction. The forward end wall of the valve cylinder is also conically shaped to match the adjacent surface of the head 3 of the plug.

Band heaters 11 and 12 encircle the barrel 9 and nozzle portion 2 of the machine.

In operation of the machine, plastics material fed into the bore of the barrel is heated in the barrel and is masticated and fed forwardly by the rotation of the screw. The plug 1 is disposed in its forward (closed) position and the softened material passes through the central passage of the valve plunger into the valve cylinder at the forward side of the plunger. The pressure of this material acts on the forward end of the plunger in opposition to the pressure of the material acting on the rearward end of the valve plunger within the bore of the barrel, and because of the greater area of its forward end the plunger is gradually pushed rearwards. The pressure applied to the rearward end of the valve plunger is slightly greater than that operating in the valve cylinder and maintains the valve plunger spaced a small distance axially from the screw to allow the material to pass through the plunger.

When the material is to be injected into a mould the plug is moved into its rearward position, rotation of the screw is stopped, and the screw is driven forward by its reciprocating motor. The tapering nose of the screw moves into sealing abutment with the chamfered rearward end of the valve plunger and pushes the valve plunger before it to eject the material in front of the valve plunger through the passage in the plug. The forward lip of the plunger may be rendered resiliently flexible by the shape of the recess in the forward end of the plunger and may flex to improve the seal between the plunger and the valve cylinder as the pressure of the material in the cylinder rises during injection.

When injection is completed the nozzle plug is closed, rotation of the screw is re-commenced and the material is again moved forwardly through the passage in the valve plunger.

The form of the plug is not material to the invention.

For injection of a normal volume of material under high pressure, a nozzle portion and valve plunger are used in which the difference in the diameters of the plunger is relatively small. If, however, a large volume of material at a lower pressure is to be injected, a nozzle portion and valve plunger providing a larger area differential will be used.

The illustrated arrangement is advantageous in that the losses of plasticized material which occur during the closure of the valve, i.e., whilst the nose of the screw is being moved into sealing abutment with the valve plunger, are less than in known arrangements. Also, the creation of any depression behind the valve plunger during injection is avoided in the illustrated arrangement; such a depression is undesirable particularly in the case of materials containing expansion agents. A further advantage of the illustrated apparatus is that the nose of the screw maintains its mixing action undiminished throughout the charging of the valve cylinder forward of the valve plunger.

Additionally the nozzle portion and valve plunger can be changed to provide a different injection pressure and volume without lessening the efficiency of the machine.

The use of interchangeable nozzle portions and valve plungers, even in the case of a very small difference in the cross-sectional areas, for the purpose of avoiding build-up on the screw, enables those parts likely to be subjected to rapid wear, i.e., the differential valve plunger and the nozzle portion, to be replaced at less cost.

The illustrated apparatus also permits the valve to be dismantled without the use of a tool and to be cleaned relatively easily.

I claim:

1. An injection moulding machine comprising a barrel having an axial bore, a screw mounted in said bore, which screw is rotatable within the bore and is movable axially along the bore, said barrel having at its forward end a nozzle portion providing within it a valve cylinder which opens to and which is of larger diameter than the bore of the barrel, a valve plunger having smaller and larger diameter portions which are slidingly and sealingly engaged in the bore of the barrel and the valve cylinder respectively, the valve cylinder being vented at its end adjacent the bore in the barrel, said valve plunger having an axial passage extending therethrough, and said valve plunger being movable forwardly along the valve bore by the screw during forward injection movement of the latter, said axial passage being sealed by the screw during such forward movement, and the nozzle portion having a nozzle aperture at the forward end thereof, and a plug mounted in the aperture which plug is selectively operable to permit and to prevent the ejection of material from the valve cylinder through the nozzle aperture.

2. An injection moulding machine as claimed in claim 1, wherein the screw has a tapered nose at its end nearer the valve plunger and wherein the valve plunger has its end adjacent the screw chamfered to form a seating for the tapered nose of the screw thereby to seal the passage through the valve plunger from the bore of the barrel when the screw abuts the valve plunger.

3. An injection moulding machine as claimed in claim 1, wherein the plug has one end thereof disposed within the valve cylinder which end tapers towards the valve plunger, the end of the valve plunger facing the tapering end of the plug having a recess with inclined sides which are substantially parallel to said tapering end of the plug whereby an annular passage is formed between the tapering end of the plug and said inclined sides of the recess.

4. An injection moulding machine as claimed in claim 1, wherein the nozzle aperture is formed at the forward end of an axial nozzle bore which opens at its rearward end to said valve cylinder, and wherein said plug comprises an elongate portion having a head on each end and sealingly mounted in the nozzle bore for axial sliding movement between two end positions in which the two heads of the plug respectively come into abutment with the nozzle portion at the forward and rearward ends of the nozzle bore, said plug having a transverse passage adjacent the head at the rearward end of the plug and an axial passage therein which extends from the forward end of the plug to said transverse passage, said transverse passage opening to the valve cylinder when the plug is in one of said end positions and being closed off by the nozzle portion when the plug is in the other of said end positions.

* * * * *